Feb. 16, 1971 TAKASHI NAKASHIMA 3,564,437
VIDEO SIGNAL AMPLIFYING CIRCUIT HAVING D.C. RESTORATION ACTION
Filed Nov. 6, 1968 3 Sheets-Sheet 1

INVENTOR
TAKASHI NAKASHIMA

BY Craig & Antonelli
ATTORNEYS

INVENTOR
TAKASHI NAKASHIMA

BY [signature]
ATTORNEYS

INVENTOR
TAKASHI NAKASHIMA

BY Craig, Antonelli, Stewart & Hill
ATTORNEYS

United States Patent Office 3,564,437

Patented Feb. 16, 1971

3,564,437

VIDEO SIGNAL AMPLIFYING CIRCUIT HAVING D.C. RESTORATION ACTION

Takashi Nakashima, Katsuta-shi, Japan, assignor to Hitachi, Ltd., Tokyo, Japan, a corporation of Japan Filed Nov. 6, 1968, Ser. No. 773,930
Claims priority, application Japan, Nov. 8, 1967, 42/71,443
Int. Cl. H03f *21/00*
U.S. Cl. 330—11 5 Claims

ABSTRACT OF THE DISCLOSURE

An amplifying clamp circuit comprising: an emitter grounded NPN transistor applied with a bias voltage to the base thereof through a series circuit of first and second resistors; a capacitor connected to the junction between said resistors to hold the electric potential of the junction; a diode inserted between the collector and said junction to allow a current flow therethrough when the collector potential becomes lower than that of said junction, thereby obtaining an amplifying clamp circuit operatingly deriving from the collector an output signal which is representative of an amplified input signal applied to the base and is clamped at the minimum level.

BACKGROUND OF THE INVENTION

Field of the invention

This invention relates to an amplifying circuit for a video signal, and more particularly to a video signal amplifying circuit having a clamping or D.C. restoration action.

DESCRIPTION OF THE PRIOR ART

Figure 1:
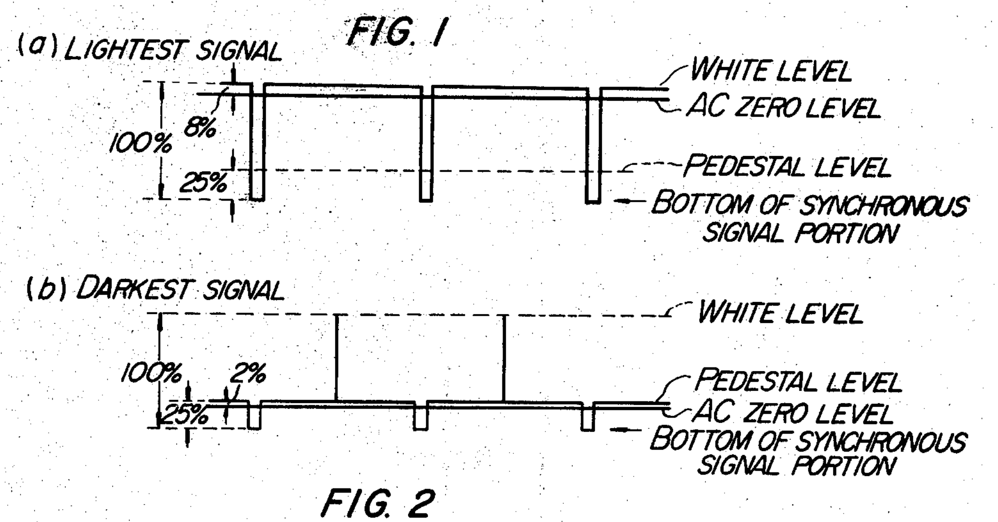
FIG. 1 shows signals transmitted by an A.C. amplifying circuit, representing two extremely different video informations.

Generally, when a video signal is amplified by an A.C. amplifier, the respective positive output peak values may differ from each other as same as the negative output peak values depending on the video signal. Consider the two extreme cases, i.e., a white signal (lightest signal) and a signal representative of white points in the black ground (darkest signal). If we assume that the peak-to-peak value from the bottom of synchronous signal portion of the video signal to the white level is 100%, the pedestal level is 25% of the peak-to-peak value and the duty factor of the synchronous signal is 8%, in the former case the positive peak value of the lightest signal becomes 8% of the total amplitude (peak-to-peak value) while its negative value is 92% shown as (a) in FIG. 1. In the latter case, however, the positive peak value of the darkest signal is 77% while its negative value is 23% shown as (b) in FIG. 1.

Therefore, the A.C. amplifier (hereinafter called a video signal amplifier) should cover these two extreme signals, i.e. 77% at the positive side and 92% at the negative side. The output should be 1.7 times as large as the peak-to-peak value. So, the power source needs a high capacity.

Further, in case of high gain transistorized video signal amplifying circuit, an appropriate bias voltage should be provided so as to suppress the occurrance of undesired distortion as much as possible and to reduce the power consumption (such provision of an appropriate bias is called as rationalization of bias).

It has been also necessary to obtain an output signal having a D.C. component restored into a video input signal which is transmitted and amplified by a video signal amplifying circuit.

SUMMARY OF THE INVENTION

An object of this invention is to provide a transistor video signal amplifier overcoming the above-mentioned defects in the prior art and accomplishing the rationalization of bias and as well as being capable of giving an output signal with D.C. restoration.

In order to accomplish the above object a diode for negative feedback is inserted between an output terminal and an input terminal which are provided respectively at the collector and the base of an amplifying transistor, and a smoothing circuit for smoothing the negative feedback current flowing through the diode is connected to the base so that the peak potential of the output A.C. signal appearing at the output terminal which is representative of the amplified input signal applied to either base or emitter may be negatively fed back as the base bias potential.

DESCRIPTION OF THE PREFERRED EMBODIMENTS

First the embodiment shown in FIG. 2 will be explained.

In this figure, $Q_1$ is an amplifying NPN transistor, E is a power source for supplying as current to the transistor $Q_1$, $C_1$ is a coupling condenser inserted between the input terminal 1 and the base of transistor $Q_1$, $R_1$ and $R_2$ are resistors for giving a bias voltage to the base, $R_3$ and $R_4$ are the emitter and collector resistors respectively, and 3 is an output terminal provided at the collector. A diode D for negative feedback is inserted between the junction 2 of the base bias resistors $R_1$ and $R_2$ and the collector of transistor $Q_1$ in the direction as shown in the figure. One end of condenser $C_2$ is connected to the junction 2 to define the electric potential there.

In this circuit when the collector voltage becomes less than the base voltage, a current flows from the junction 2 to the collector through the diode D. Thus, the collector and the junction 2 have substantially the same electric potential and they balance instantaneously. (More precisely, the potential of junction 2 is a bit larger than that of the collector by the potential drop of the diode.) The following inequality should hold for the balance condition.

$$(R_1+R_2)<\beta_1 \cdot R_4 \qquad (1)$$

where $\beta_1$ is the current amplification factor of the transistor $Q_1$.

Next, the operation of this circuit will be described when an input signal, having the waveform (a) of FIG. 2 without its D.C. component because of condenser $C_1$, is applied at the input terminal 1.

If the input signal is positive, the potential of the collector decreases and a negative feedback current flows to the collector throngh the diode D. This the base potential decreases instantaneously and the circuit recovers in its balanced state so that a clamping action is obtained. An electric charge is stored in the condenser $C_2$ while the feedback current flows during the feedback period. Next, if the input signal decreases or becomes negative, no current flows through the diode. The electric charge stored in the condenser $C_2$ is discharged gradually through the resistor $R_1$, so raises the potential at the junction 2. When the input signal increases again and the collector potential becomes less than the potential at the junction 2, the negative feedback action appears again, and similar phenomena are repeated.

Figure 2:
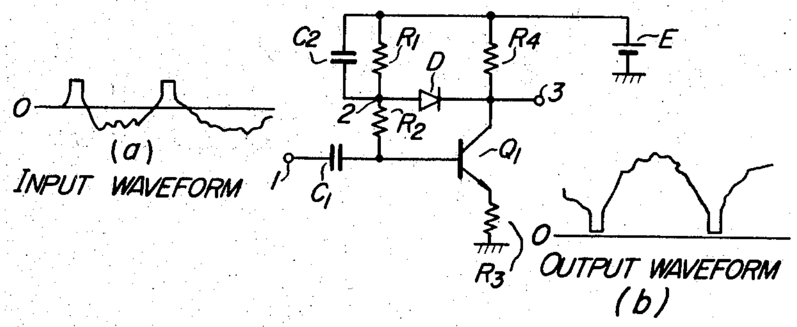
FIGS. 2 to 5 and 7–10 show circuits according to the embodiments of this invention.

As the result, the input signal (a) of FIG. 2 is reversely amplified. A D.C. output signal (b) shown in FIG. 2 with its minimum value clamped at the balanced voltage is obtained at the output terminal 3.

The emitter resistor $R_3$ is employed to lessen the distortion due to the non-linearity of the transistor. As the value of resistor $R_3$ increases, the distortion decreases but the potential at the clamping point fluctuates more in response to change in the input signal level. The value of the resistor $R_3$ is, therefore, preferably as small as possible within the allowable limit of distortion. The resistor $R_3$ may thus be short-circuited.

In the circuit of this embodiment, at the time of clamping due to flow of the current towards the collector through the diode D, the current flowing in the resistor $R_4$ may decrease instantaneously, which generates small clip distortion. Since this distortion is nearly proportional to the amount of the current which flows through the balancing diode and charges the condenser $C_2$ up to the balancing voltage, the current is preferably small. So, the value of resistor $R_1$ is selected large enough to prolong the discharge time. the value of resistor $R_2$ is, on the contrary, preferably small.

Figure 3:
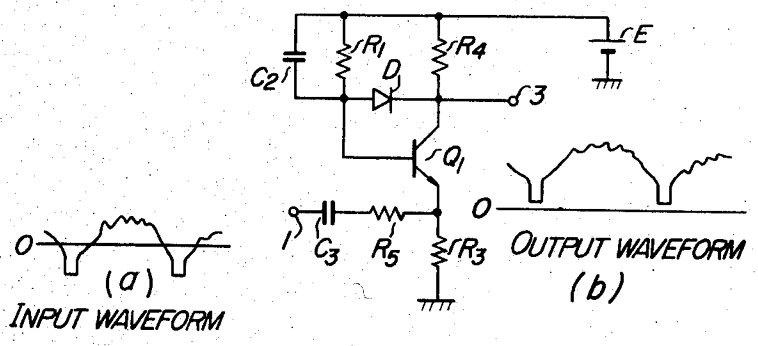

FIG. 3 shows another embodiment of this invention. The circuit shown in this figure is so designed that the input signal is applied at the emitter instead of the base as shown in the circuit of FIG. 2. Like reference numerals are used to denote like parts.

In this circuit, the value of $R_2$ is zero. The input terminal 1 is connected to the emitter through a coupling condenser $C_3$ and a resistor $R_5$ for keeping the input impedance constant.

The influence of the non-linearity of transistor $Q_1$ is determined by the sum of the resistances of the parallel resistors $R_3$ and $R_5$. If it is equal to the value of $R_3$ in FIG. 2, the distortions in both circuits are nearly equal.

The clip distortion appearing in the circuit of FIG. 3 is of the same order as the circuit of FIG. 2.

Although the circuit of FIG. 3 has a lower gain than the circuit of FIG. 2, it is useful for the case when the input and the output are required to be in phase.

Figure 4:
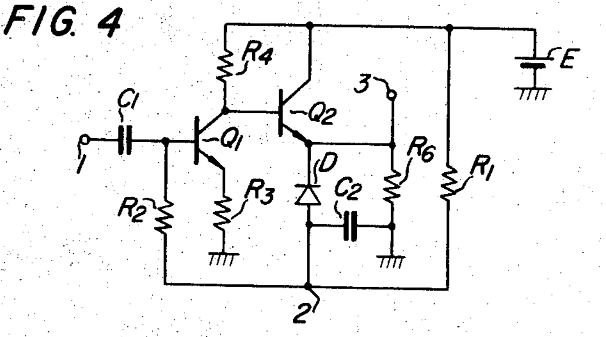
Figure 5:
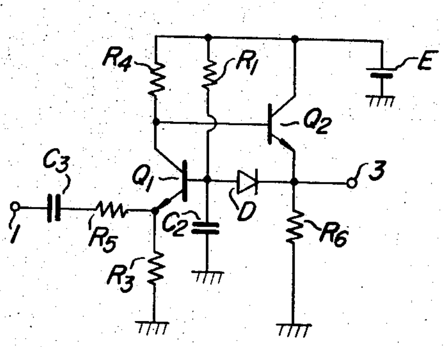

In FIGS. 4 and 5, a transistor $Q_2$ in an emitter follower configuration is connected to the collector of transistor $Q_1$. An emitter resistor $R_6$ is inserted between the emitter of transistor $Q_2$ and the common potential point. The output terminal 3 is provided at the emitter of transistor $Q_2$. Other like reference numerals are used to denote like parts as in FIGS. 2 and 3.

Figure 6:
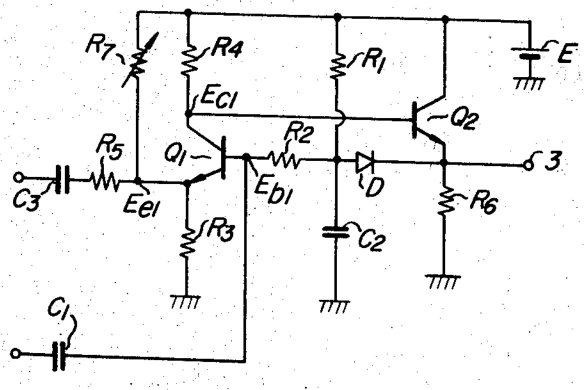
FIG. 6 shows a circuit for explaining the action of the circuits shown in FIGS. 4 and 5.
Figure 7:
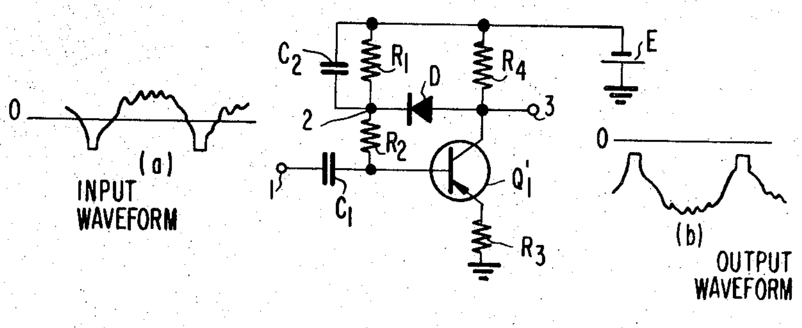
Figure 8:
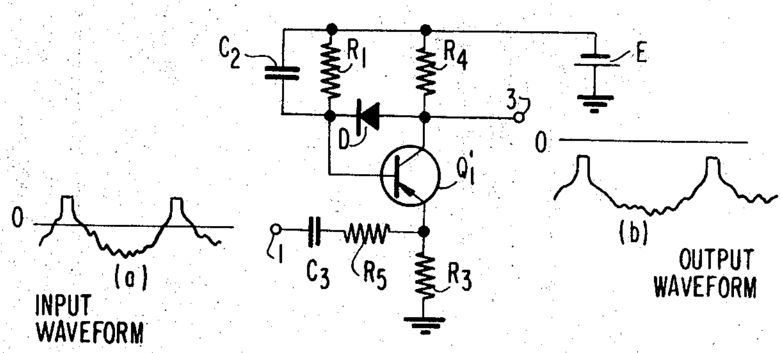
Figure 9:
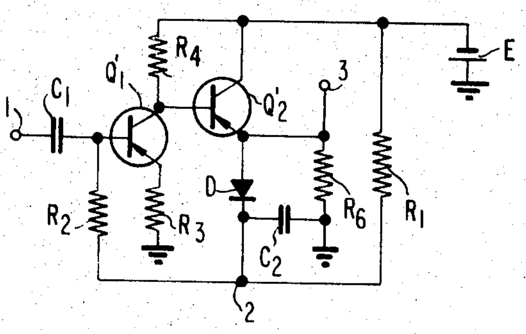
Figure 10:
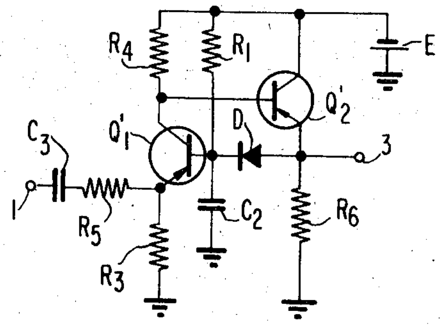

The circuit in FIG. 6 is used for the analysis of the operations of the circuits of FIGS. 4 and 5. If the values of resistors $R_5$ and $R_7$ are infinite in FIG. 6, the circuit becomes equivalent to the circuit of FIG. 4. If the value of resistor $R_7$ is infinite and $R_2$ is short-circuited, the circuit becomes equivalent to the circuit of FIG. 5.

In order that the circuit of FIG. 6 makes the normal operation, the following conditions are required.

$$R_1 < \beta_1 \cdot R_4 \quad (2)$$

$$\frac{E_{out}}{R_6} \cdot \overline{DF} > \frac{E_{bb} - E_{b1}}{R_1} - \frac{E_{bb} - E_{c1}}{\beta_1 R_4} \quad (3)$$

where:

$\beta_1$—current amplification factor of transistor $Q_1$,
$\overline{DF}$—duty factor of diode D,
$E_{out}$—signal output (A.C. component),
$E_{bb}$—voltage of power source E,
$E_{b1}$—base potential of transistor $Q_1$,
$E_{c1}$—collector potential of transistor $Q_1$.

The first time of the right hand side of relation (3) shows the current supplied to the base of transistor $Q_1$ through the resistor $R_1$ while the second term shows the current flowing to the base of transistor $Q_1$. So, the right hand side shows the current flowing into the condenser $C_2$ during one period of clamp. The discharge current through the diode D at the time of clamp is equal to the right hand divided by $\overline{DF}$.

If the discharge current of diode is selected less than the current flowing through the resistor $R_6$ of the emitter follower transistor $Q_2$ at the time of clamp, the clip distortion can be eliminated by the relation (3). As seen from the relation (3), an excessively large value of resistor $R_6$ leads to the cutoff of transistor $Q_2$, which will cause clip distortion.

The output $E_{out\ o}$ obtain at the output terminal in the absence of an input is equal to the minimum electric potential $E_{out\ min}$ of the output signal $E_{out}$, as given by the following equation $$E_{out\ min} = E_{out\ o} = E_{e1\ min} + E_{be1} - E_d \quad (4)$$

where:

$E_{be1}$—base-emitter voltage of transistor $Q_1$,
$E_d$—forward voltage of diode D,
$E_{e1\ min}$—emitter potential of transistor $Q_1$ in the absence of input.

The current flowing from the transistor $Q_1$ to transistor $Q_2$ and the base current of transistor $Q_1$ are negligibly small, thus the current flowing through the resistor $R_3$ can be expressed as the sum of the currents flowing flowing through the resistors $R_4$ and $R_7$:

$$\frac{E_{e1\ min}}{R_3} = \frac{E_{bb} - E_{e1\ min}}{R_7} + \frac{E_{bb} - E_{c1\ min}}{R_4} \quad (5)$$

where $E_{c1}$ is the collector potential of transistor $Q_1$ in the absence of an input.

Also $E_{c1}$ is given by:

$$E_{c1} = E_{out\ min} + E_{be2} \quad (6)$$

where $E_{be2}$ is the base-emitter voltage of transistor $Q_2$.

From Equations 4, 5 and 6 we obtain:

$$\frac{E_{e1\ min}}{R_3} = \frac{E_{bb} - E_{e1\ min}}{R_7} + \frac{E_{bb} - E_{e1\ min} - E_{be1} - E_{be2} + E_d}{R_4} \quad (7)$$

Rearranging by $E_{e1}$, we have:

$$E_{e1\ min}\left(\frac{1}{R_3} + \frac{1}{R_4} + \frac{1}{R_7}\right) = E_{bb}\left(\frac{1}{R_7} + \frac{1}{R_4}\right) - \frac{E_{be1} + E_{be2} - Ed}{R_4} \quad (8)$$

$$E_{e1\ min} = \frac{E_{bb}\left(\frac{1}{R_7} + \frac{1}{R_4}\right) - \frac{E_{be1} + E_{be2} - Ed}{R_4}}{\frac{1}{R_3} + \frac{1}{R_7} + \frac{1}{R_4}} \quad (9)$$

If $R_7$ is infinite and $R_3/R_4$ is small, we obtain from Equations 5, 6 and 9:

$$E_{c1\ min} \doteqdot E_{be1} + E_{be2} - E_d \quad (10)$$

$$E_{out\ min} = E_{be1} - E_d \quad (11)$$

The maximum collector potential $E_{c1\ max}$ of transistor $Q_1$ for the maximum input is given by:

$$E_{c1\ max} = \frac{\beta_2 R_3}{R_4 + \beta_2 R_3} E_{bb} \quad (12)$$

where $\beta_2$ is the current gain of transistor $Q_2$. If $R_3$ is infinite, $E_{c1\ max}$ is nearly equal to $E_{bb}$.

The maximum signal output $E_{out\ max}$ is thus given by:

$$E_{out\ max} = E_{c1\ max} - E_{be2} \quad (13)$$

Thus a sufficiently large output amplitude can be obtained from the power source voltage $E_{bb}$, as shown by Equations 11, 12 and 13.

Therefore, according to the circuits of the embodiments shown in FIGS. 2 to 5, an output is obtained the minimum value of which is clamped at a certain level. The output has a large dynamic range within the range of the power source voltage $E_{bb}$ with its D.C. component restored. Thus, the objects of this invention are fully attained.

Although in the above embodiments NPN type transistors $Q_1$ and $Q_2$ are used to constitute the circuit clamped at the minimum value of the output signal PNP type transistors $Q'_1$ and $Q'_2$ may, however, be used to constitute the circuit capable of clamping the maximum value of the output signal at a certain level by inserting the diode in such a direction that a negative feedback current may flow from the output terminal to the input terminal and by selecting the circuit constants such that the maximum output is nearly equal to the maximum D.C. output level the amplifier as shown in FIGS. 7–10.

The circuits shown in FIGS. 7–10 are illustrated in substantially the same form as the circuits shown in FIGS. 2–5, respectively, so that the same reference characters or numbers designate corresponding like parts. Thus, it can be seen that the only difference between these two sets of figures is the type of transistor employed.

What is claimed is:

1. A video signal amplifying circuit providing D.C. restoration action comprising:
   - a first amplifying transistor having a base, an emitter and a collector, said emitter being connected to a coupling capacitor to receive a video input signal;
   - an emitter resistor also connected to the emitter of said transistor for grounding the emitter therethrough;
   - a load resistor connected to the collector of said transistor;
   - a power source for supplying operating power to said transistor through said emitter resistor and said load resistor;
   - a base bias circuit including a first base bias resistor and means for coupling said first base bias resistor to the base of said transistor and a bias capacitor, said base bias resistor being connected at one end thereof to said power source and at the other end thereof to said coupling means, said bias capacitor being connected at one end thereof to said coupling means and said first base bias resistor;
   - output means coupled to the collector of said transistor and having an output terminal for delivering an output signal; and
   - a diode having an anode and a cathode connected between the output terminal and said coupling means in such a manner that the diode is coupled in parallel and with the same polarity as the collector-base junction of said transistor, so that the potential at the output terminal is fed back to the base electrode and accumulated on the bias capacitor when the diode is conducting, whereby the output signal obtained from the output terminal is D.C. restored.

2. A video signal amplifying circuit according to claim 1, wherein said first amplifying transistor is an NPN transistor, and wherein the anode of said diode is connected to the junction point between said first base bias resistor, said coupling capacitor and said coupling means while the cathode of said diode is connected to said output terminal so that the minimum level of the output signal is clamped.

3. A video signal amplifying circuit according to claim 1, wherein said first amplifying transistor is a PNP transistor, and wherein the anode of said diode is connected to the output terminal while the cathode of said diode is connected to the junction point between said first base bias resistor, said coupling capacitor and said coupling means, so that the level of the signal obtained at the output terminal is clamped at a maximum.

4. A video signal amplifying circuit according to claim 1, wherein said output means comprises a second amplifying transistor having an emitter, a base connected to the collector of said first amplifying transistor and a collector connected to said power source, a second emitter resistor connected to the emitter of said second amplifying transistor for grounding the emitter of said second amplifying transistor therethrough, so that said power source supplies operating power to said second amplifying transistor through said second emitter resistor, and wherein the emitter of said second amplifying transistor is connected to said output terminal.

5. A video signal amplifying circuit according to claim 1, wherein said coupling means is a short circuiting wire.

References Cited

UNITED STATES PATENTS

| | | | |
|---|---|---|---|
| 2,254,114 | 8/1941 | Wilson | 330—11X |
| 2,850,627 | 9/1958 | Moore et al. | 178—7.1UX |

FOREIGN PATENTS

| | | | |
|---|---|---|---|
| 920,053 | 3/1963 | Great Britain | 330—29 |
| 923,173 | 4/1963 | Great Britain | 330—11 |

ROY LAKE, Primary Examiner

J. B. MULLINS, Assistant Examiner

U.S. Cl. X.R.

307—237; 330—24, 29, 110